United States Patent
Sah et al.

(10) Patent No.: US 7,103,463 B2
(45) Date of Patent: Sep. 5, 2006

(54) HYDRAULIC CLUTCH STATE DIAGNOSTIC AND CONTROL

(75) Inventors: Jy-Jen F. Sah, West Bloomfield, MI (US); Todd M. Steinmetz, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 54 days.

(21) Appl. No.: 10/845,995

(22) Filed: May 15, 2004

(65) Prior Publication Data

US 2005/0256625 A1    Nov. 17, 2005

(51) Int. Cl.
*G06F 17/00*    (2006.01)

(52) U.S. Cl. ....................................... 701/67

(58) Field of Classification Search ............... 701/67; 477/57, 66, 667, 168, 121, 177
See application file for complete search history.

(56) References Cited

U.S. PATENT DOCUMENTS

2004/0192506 A1* 9/2004 Nakamura ............... 477/176

* cited by examiner

*Primary Examiner*—Thu V. Nguyen
(74) *Attorney, Agent, or Firm*—Christopher DeVries

(57) ABSTRACT

Clutch engagement is preferably determined in accordance with monitored pressure conditions within a clutch control chamber. Clutch slip is monitored and information respecting clutch engagement inferred therefrom is stored for subsequent retrieval and use in a redundant slip based clutch engagement determination. Clutch slip is also monitored for information respecting clutch disengagement for use in a redundant slip based clutch disengagement determination.

15 Claims, 6 Drawing Sheets

HYDRAULIC CLUTCH STATE DIAGNOSTIC AND CONTROL

TECHNICAL FIELD

The present invention is related to vehicular transmissions. More particularly, the invention is concerned with determination of hydraulic clutch apply and release states in a vehicular transmission.

BACKGROUND OF THE INVENTION

Vehicular powertrains commonly include conventional multi-ratio, automatic transmissions and electro-hydraulic controls for effecting speed ratio changes or gear shifts. Controllable torque transfer devices, commonly clutch packs or band clutches, are utilized to transfer torques between planetary gearset members to effect speed ratio changes. Each such shift typically comprises at least one oncoming clutch application or offgoing clutch release. Often times, at least one offgoing clutch release and one oncoming clutch application is associated with a speed ratio change.

Clutch apply and release timings are critical to effective speed ratio shift control. Accurate knowledge of clutch apply or release state can significantly affect shift quality. Inaccuracy in clutch state knowledge can result in excessive and premature clutch wear. Additionally, loss of clutch state knowledge can result in significantly reduced vehicle performance since substantial compromises in shift controls may need to be made absent such knowledge. And, loss of clutch state knowledge may even result in vehicle disablement.

Typically, clutch states are determined from direct sensor inputs. For example, a hydraulically actuated clutch system may include pressure switches or transducers in communication with respective clutch control chambers for inferring clutch application when pressure is sensed above a predetermined threshold and clutch release when pressure is sensed below a predetermined threshold. Loss of pressure signals from such sensors can occur from a variety of factors including, for example, sensor failure, connector or wiring faults, and even internal controller faults.

Electrically variable transmissions are know which also utilize electro-hydraulic controls to effect clutch applications and releases. Clutch applications and releases in such transmissions are somewhat similarly utilized to establish ranges of speed ratios corresponding to selected gearsets in accordance with certain clutch application and release combinations. The number of degrees of freedom in an electrically variable transmission can make clutch state knowledge even more critical to operation than in a conventional multi-ratio, automatic transmission.

Therefore, what is needed is a robust system for determining clutch states in a electro-hydraulically controlled transmission. Particularly, it is desirable to provide for a robust diagnostic and recover control suitable for application to an electrically variable transmission.

SUMMARY OF THE INVENTION

The present invention indicates clutch application subsequent to issuance of a clutch apply command which effects fluid pressure changes in a clutch control chamber. When a clutch apply command is issued an historical clutch apply time previously recorded is accessed. Clutch apply fluid pressure is monitored to provide an apply signal indicative of clutch application as a function of clutch apply fluid pressure and a release signal indicative of clutch release as a function of clutch apply fluid pressure. Clutch application is indicated upon the first to occur of the pressure monitor providing the apply signal and the historical clutch apply time being exceeded.

Provided is a method for indicating clutch state change in a clutch system including a clutch fluidically applied in accordance with fluid pressure in a control chamber. The method includes providing a fluid pressure based clutch state switch characterized by a respective first state signal indicating clutch application and a respective second state signal indicating clutch release. A slip based clutch state switch characterized by a respective first state signal indicating clutch application and a respective second state signal indicating clutch release is also provided. And, a clutch state change signal upon the first of the respective pressure based clutch state switch and the slip based clutch state switch state signals to change is finally provided.

Specifically in accordance with a preferred implementation of the invention, a clutch engagement command is received. The time it takes for clutch slip to attain a predefined minimum slip condition is then stored. The stored time is retrieved upon a subsequent clutch engagement command. Applied fluid pressure in the clutch control chamber is monitored for a pressure indicative of clutch engagement. And, clutch engagement is determined upon the first to occur of the applied fluid pressure attaining the pressure indicative of clutch engagement and passage of a duration measured from the subsequent clutch engagement command based upon said stored time.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
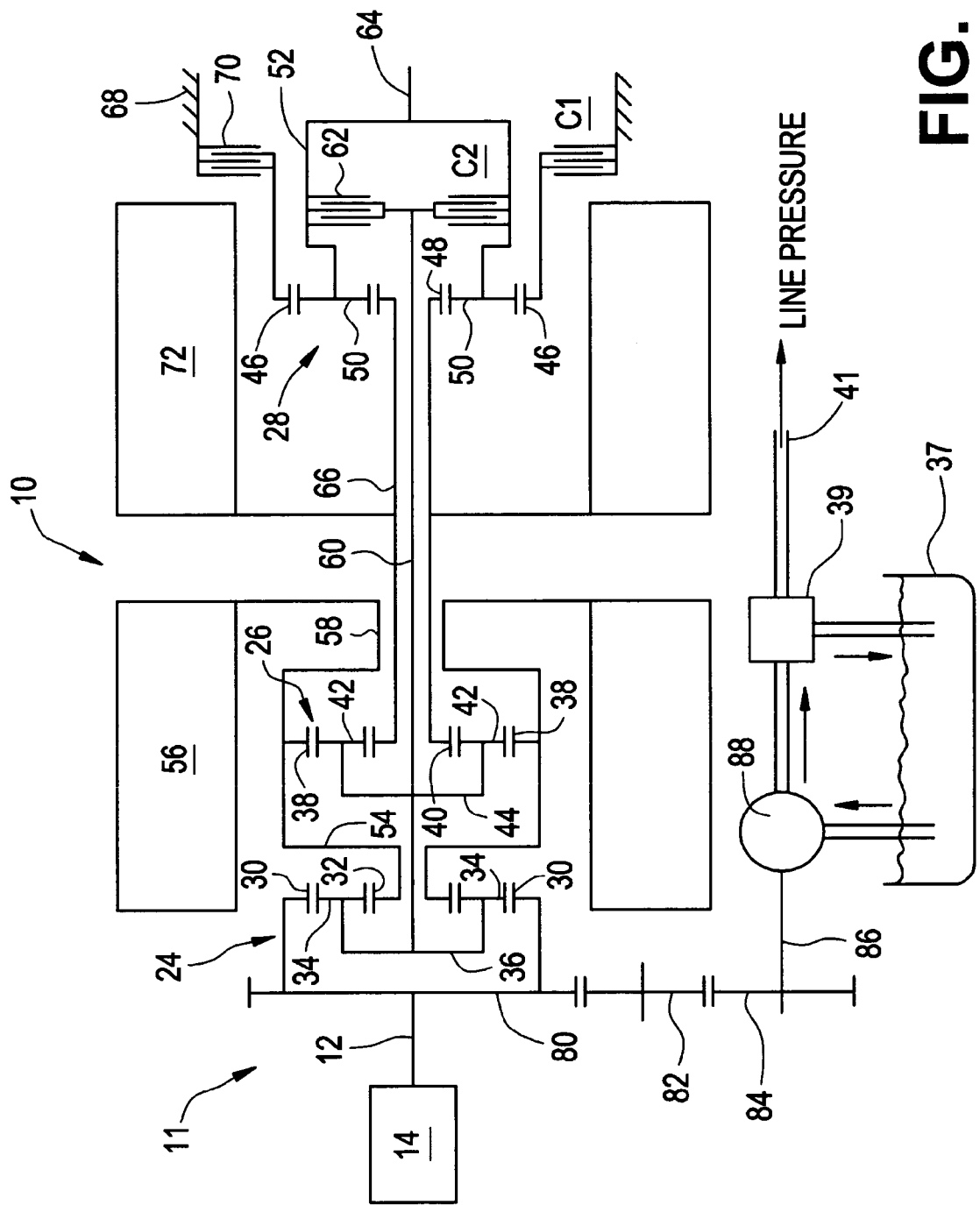
FIG. 1 is a mechanical hardware schematic representation of one preferred form of a two-mode, compound-split, electrically variable transmission particularly suited to the implementation of the present invention.
Figure 2:
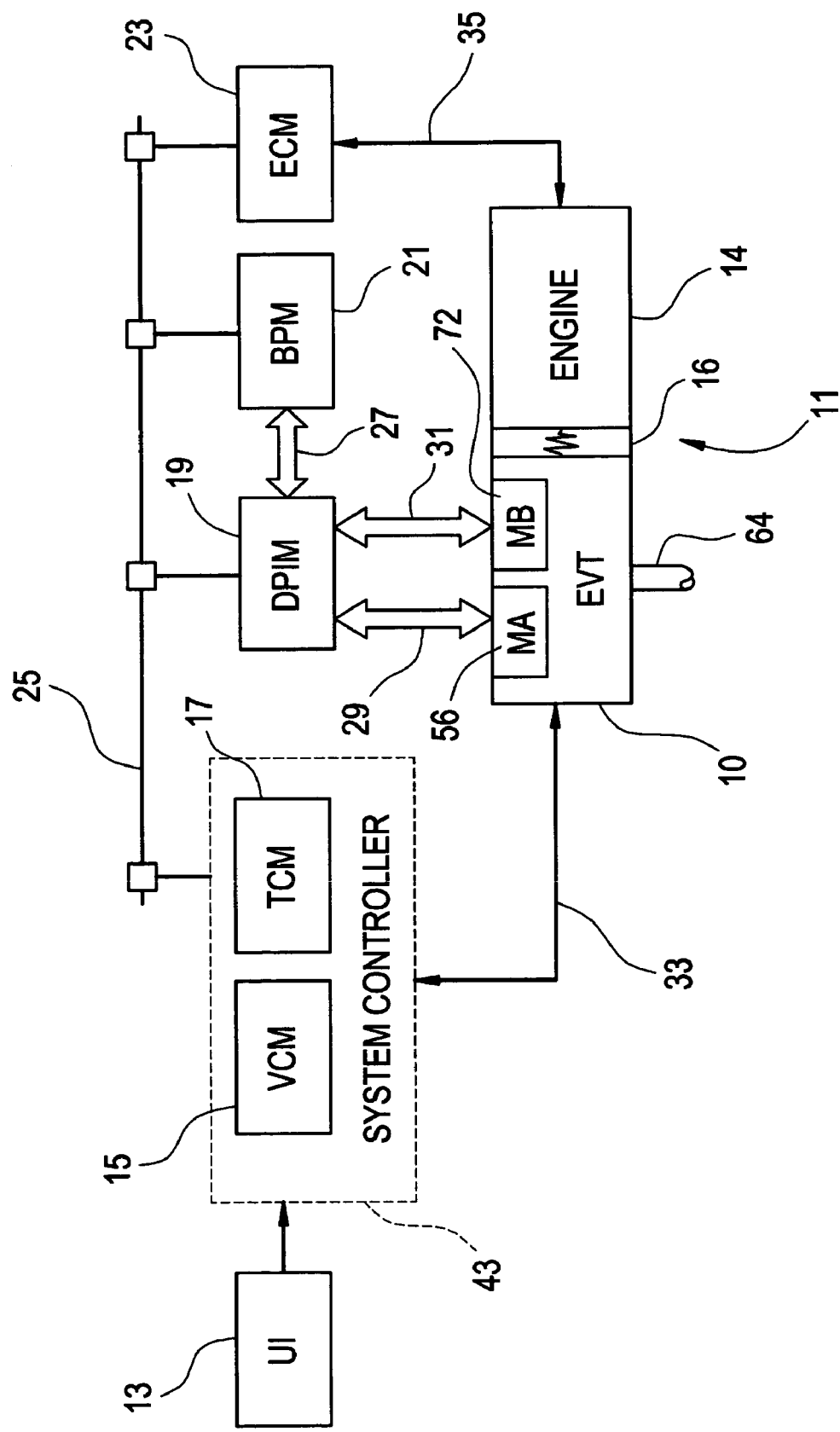
FIG. 2 is an electrical and mechanical schematic of a preferred system architecture for the hybrid powertrain disclosed herein.

With reference first to FIGS. 1 and 2, a vehicular powertrain system is generally designated 1. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those figures, the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or $M_A$.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or $M_B$. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e.: the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28. As used herein, when a mode related to a gear train is referenced an upper case designation MODE 1 or MODE 2, or M1 or M2, will generally be used.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module (ECM) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engine electronics, controls and quantities are generally well known to those skilled in the art and further detailed exposition thereof is not required herein As should be apparent from the foregoing description the EVT 10 selectively receives power from the engine 14. As will now be explained with continued reference to FIG. 2 the EVT also receives power from an electric storage device such as one or more batteries in battery pack module (BPM) 21. The powertrain system also includes such energy storage devices which are an integral part of the power flows thereof. Other electric storage devices that have the ability to store electric power and dispense electric power may be used in place of the batteries without altering the concepts of the present invention. The BPM 21 is high voltage DC coupled to dual power inverter module (DPIM) 19 via DC lines 27. Current is transferable to or from the BPM 21 in accordance with whether the BPM 21 is being charged or discharged. DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 31 and provides current to the DC lines 27. The net DC current provided to or from the inverters determines the charge or discharge operating mode of the BPM 21. Preferably, $M_A$ and $M_B$ are three-phase AC machines and the inverters comprise complementary three-phase power electronics. Individual motor speed signals Na and Nb for $M_A$ and $M_B$, respectively, are also derived by the DPIM 19 from the motor phase information or conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, System controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Trim valves are preferably employed using variable bleed solenoids to provide precise placement of the spool within the valve body and correspondingly precise control of clutch pressure during apply. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, $M_A$ speed Na and $M_B$ speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others.

System controller 43 determines a torque command Te_cmd and provides it to ECM 23. Torque command Te_cmd is representative of the EVT torque contribution desired from the engine as determined by the system controller. System controller 43 also determines a speed command Ne_des representative of the EVT input speed desired, which in the direct coupled arrangement between the engine and the EVT is also the desired engine speed operating point. With the direct coupled arrangement exemplified herein, the engine torque and the EVT input torque, Te and Ti respectively, are equivalent and may be referred to in the alternative herein. Similarly, the engine speed and the EVT input speed, Ne and Ni respectively, are equivalent and may be referred to in the alternative herein. Desired input speed operating points are preferably determined as disclosed in commonly assigned and co-pending U.S. patent application Ser. Nos. 10/686,508 and 10/686,034 which are incorporated herein by reference. A preferred speed control for a hybrid transmission is described in detail in commonly assigned and co-pending U.S. patent application Ser. No. 10/686,511 which is incorporated herein by reference.

The various modules described (i.e. system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example the preferred protocol for heavy duty applications is the Society of Automotive Engineers standard J1939. The CAN bus and appropriate protocols provide for robust messaging and multi-controller interfacing between the system controller, ECM, DPIM, BPIM and other controllers such as antilock brake and traction controllers.

Figure 3:
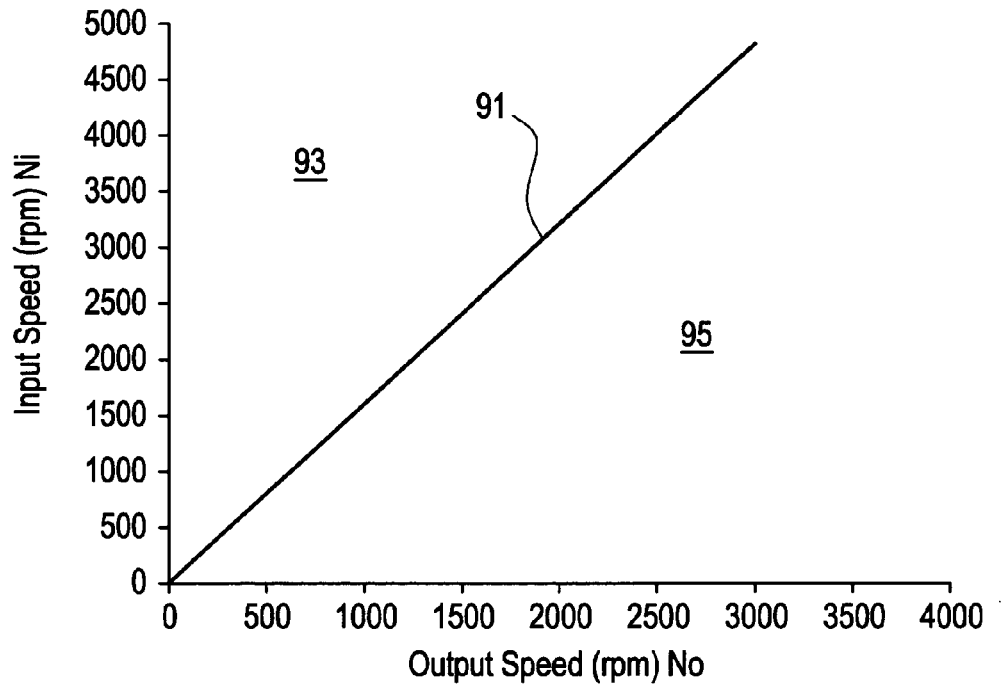
FIG. 3 is a graphical representation of various regions of operation with respect to input and output speeds and corresponding to different speed ratio gearsets established through electro-hydraulic clutch controls of the exemplary electrically variable transmission disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be effected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited.

While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g. mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g. mass, size, cost, inertial capabilities, etc.) to the high speeds of region 95. Region 93, wherein MODE 1 operation is generally preferred, may be considered a low speed region whereas region 95, wherein MODE 2 operation is generally preferred, may be considered a high speed region. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

Figure 4:
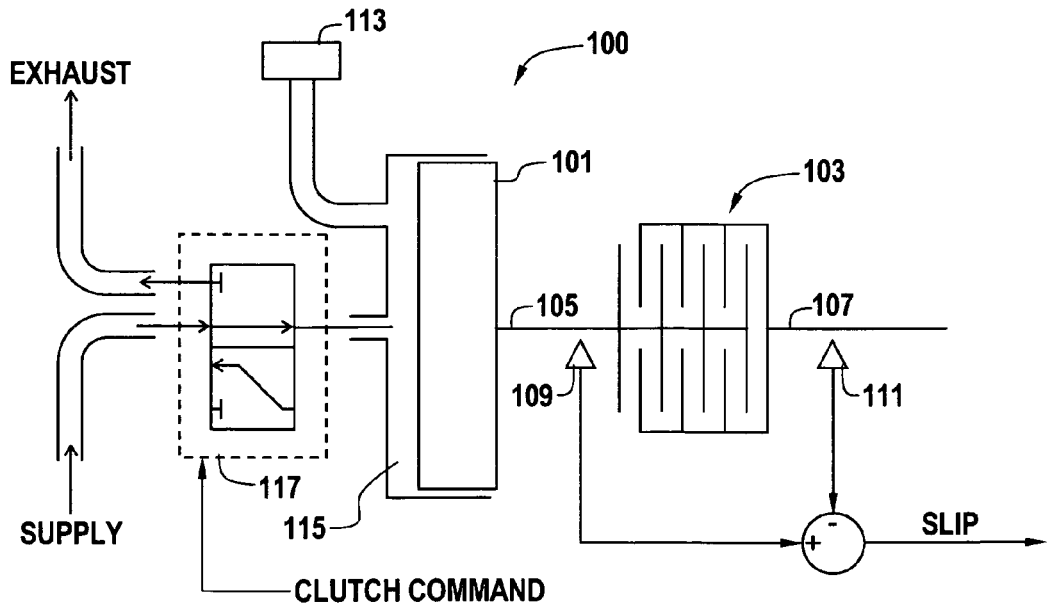
FIG. 4 is a schematic diagram of an exemplary electro-hydraulic clutch apparatus in accordance with the present invention.

With reference now to FIG. 4, an exemplary electrohydraulic clutch apparatus in accordance with the present invention is schematically illustrated and labeled 100. The apparatus includes a piston 101 acted upon by hydraulic fluid pressure in clutch chamber 115 to engage clutch pack 103 thereby establishing torque transfer between rotating members 105 and 107. Piston 101 is acted upon in the opposite direction by a return spring (not separately illustrated). Clutch chamber fluid pressure is monitored by pressure sensor 113 which may take the form of a wide range sensor for detecting a continuum of pressures or a pressure switch for detecting a calibrated pressure threshold. A pressurized supply of fluid (SUPPLY) is controllably provided to the clutch chamber by controlled valve apparatus 117. Exhausted fluid from the clutch chamber (EXHAUST) is similarly controlled by valve apparatus 117. Generally, exhausting of the clutch chamber is blocked when the clutch is desirably applied and enabled when the clutch is desirably released. Valve apparatus 117 is controlled by CLUTCH COMMAND to establish the desired clutch chamber pressure condition and resultant clutch applied or released state. An exemplary clutch fill and exhaust valve apparatus is disclosed in commonly assigned and co-pending U.S. patent application Ser. No. 10/686,177. Clutch slip speeds across clutches C1 and C2 are preferably derived from output speed No, EVT first motor/generator 56 $M_A$, operating at speed Na and second motor/generator 72 $M_B$ operating at speed Nb. Specifically, slippage of clutch C1 is a function of No and Nb, whereas C2 slip is a function of No, Na and Nb. Alternatively, conventional rotation sensors 109 and 111 may provide rotational speed signals at respective rotating members 105 and 107. The rotational speed signals are combined to establish a measure of the relative slip (SLIP) across the clutch.

Figure 5:
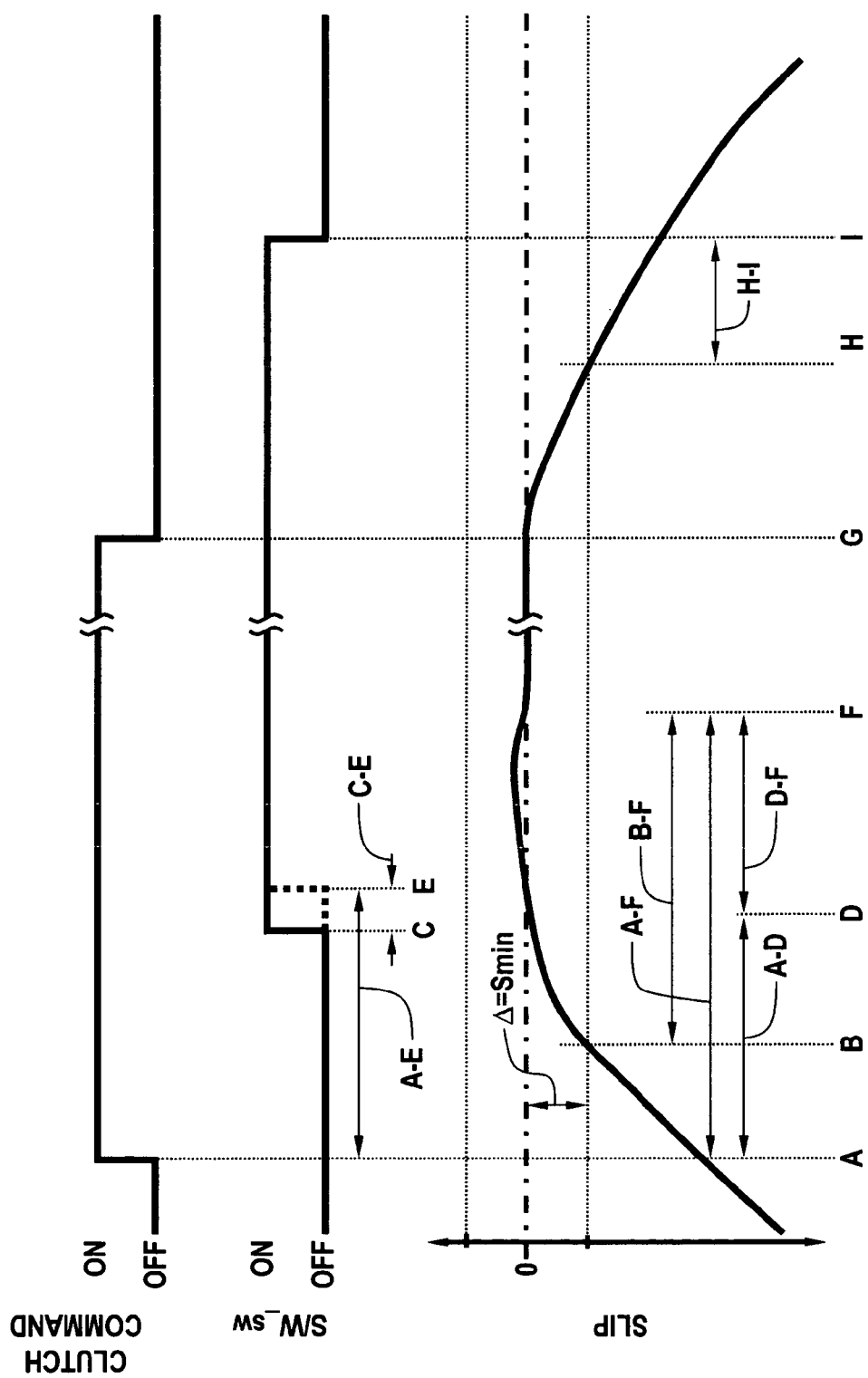
FIG. 5 is a diagram illustrating slip-based indicators of clutch application and release in accordance with the present invention.

In FIG. 5, CLUTCH COMMAND signal, generated by the system controller, is exhibiting an apply state at time A and a release state at subsequent time G. At time A, a valve apparatus is commanded to apply fluid pressure to the corresponding clutch. In accordance with the present invention, an apply timer begins recording from the CLUTCH COMMAND taking the apply state at time A. At time B whereat the corresponding clutch exhibits a predetermined minimum SLIP (Smin), another timer counts down a predetermined confidence duration (B–F). SLIP is monitored during this confidence duration count down. Assuming that SLIP remains less than Smin during the confidence duration, a successful clutch apply is inferred and the value of the apply timer (A–F) is recorded. Next, a predetermined duration (D–F), preferably less than the confidence duration (B–F) is subtracted from the apply timer. The resultant time is stored as the clutch apply time (A–D). Preferably, the clutch apply time (A–D) is stored as a function of sump temperature Ts in a cell of a temperature indexed table. Such a table is continually updated with new values for apply time at various sump temperature Ts to effect an adaptive reference table of clutch apply times.

In the clutch application cycle illustrated in FIG. 4, an indicator of clutch state based on a historical clutch apply time determined and stored as described in the immediately preceding paragraph is demonstrated. The indicator is referred to herein as software switch (S/W_sw) to distinguish it from an indicator based on a clutch chamber pressure sensor which is referred to herein as a hardware switch (H/W_sw). At time A, substantially contemporaneously with CLUTCH COMMAND taking the apply state, an historical clutch apply time is retrieved. If prior values for clutch apply time were stored in cells according to sump temperature Ts, then the historical clutch apply time retrieved corresponds to the current sump temperature Ts. The time retrieved corresponds to the duration designated A–E. Preferably, the retrieved time is adjusted to account for computational delays by a duration C–E. The adjusted retrieved historical clutch apply time is counted down and upon expiration effects setting of the software switch, such as a software flag or equivalent, at time C thus providing an indication of clutch application. Without the adjustment for computational delay, the historical clutch apply time would expire at time E. Further use of the software switch in conjunction with a hardware switch is described further herein below in conjunction with FIGS. 6–9.

CLUTCH COMMAND signal is also exhibiting a release state at time G and a release state at subsequent time G in FIG. 5. At time G, a valve apparatus is commanded to exhaust fluid pressure from the corresponding clutch. In accordance with the present invention, SLIP is monitored and when it falls below the predetermined minimum SLIP (Smin), a timer counts down a predetermined confidence duration (H–I). SLIP is monitored during this confidence duration count down. Assuming that SLIP remains greater than Smin during the confidence duration, a successful clutch release is inferred and software switch S/W_sw is reset at time I thus providing an indication of clutch release. Further use of the software switch in conjunction with a hardware switch is described further herein below in conjunction with FIGS. 6–9.

Reference is now made to FIGS. 6–9 which illustrate various normal and anomalous hardware switch operation and software switch recovery in response thereto to effect appropriate clutch application and release determinations in accordance with the present invention. It is desirable that the hardware switch is given priority in the determination of clutch state and that the software switch provides back-up functionality or recovery from a hardware switch anomaly. In all FIGS. 6–9, normal operation of the hardware switch would indicate an ON state at time A and an OFF state at time E.

Figure 6:
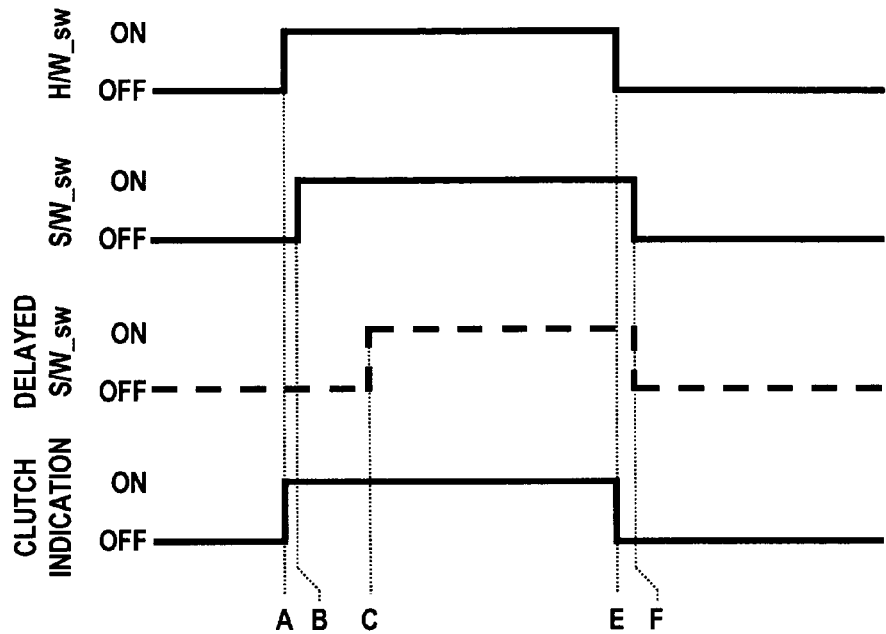
FIG. 6 is a diagram illustrating clutch apply and release diagnosis in a normally operating electro-hydraulic clutch apparatus in accordance with the present invention.

FIG. 6 first illustrates a normal hardware switch H/W_sw response to clutch chamber pressure. CLUTCH INDICATION is seen to correspond to the transistions of H/W_sw at times A and E. In order to provide the desired priority to H/W_sw, it is necessary that the state changes of S/W_sw occur at a time subsequent to the normal state change times of H/W_sw. As such, a delay of sufficient duration may be introduced to the state changes of S/W_sw as shown by DELAYED S/W_sw which has a delay upon clutch application indication of substantially B–C. Such a delay is preferably set in accordance with normal expected range for the state change of H/W_sw indicative of clutch application. Since neither state change of DELAYED S/W_sw precedes the corresponding state change for H/W_Sw, the hardware switch provides the indication of clutch application and release as expected from a normally operational hardware switch based clutch state diagnostic.

Figure 7:
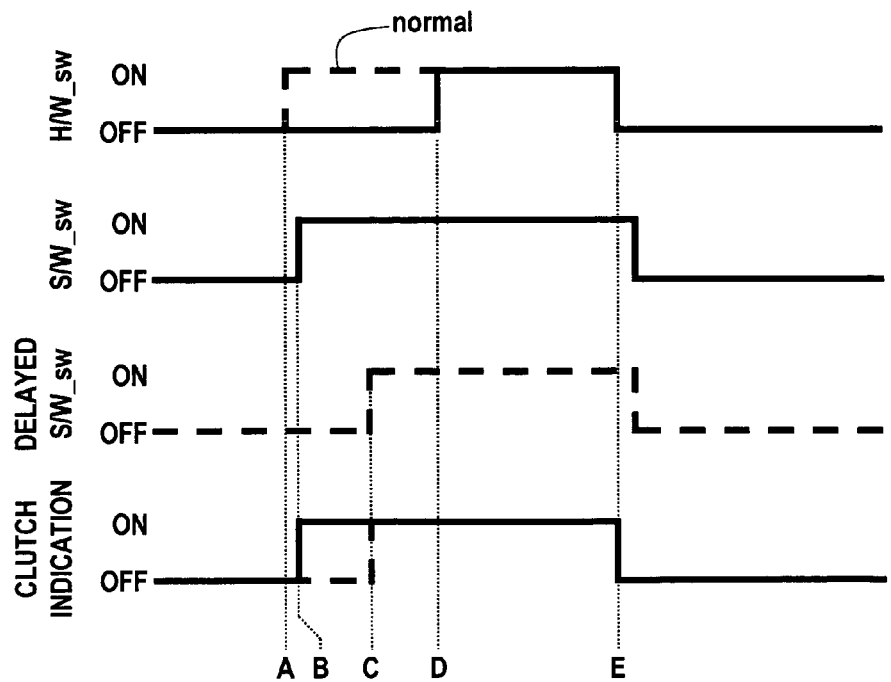
FIG. 7 is a diagram illustrating clutch apply and release diagnosis in an electro-hydraulic clutch apparatus experiencing a pressure switch anomaly affecting clutch application determination in accordance with the present invention.

FIG. 7 illustrates a hardware switch H/W_sw response to clutch chamber pressure that is normal with respect to a release at time E but anomalous with respect to an application. The clutch application is shown indicated by the state change in H/W_sw at time D which is significantly delayed from the normally expected time A and outside of the delay duration provided with respect to the software switch S/W_sw. Such an anomalous result may be occasioned by a sticking or out of calibration pressure sensor, for example. An undelayed software switch would result in CLUTCH INDICATION state change indicative of clutch application substantially at time B whereas a delayed software switch would result in CLUTCH INDICATION state change indicative of clutch application substantially at time C. Since the state change of H/W_sw indicative of clutch release comports with normal operation, the hardware switch provides the indication of clutch release as expected from a normally operational hardware switch based clutch release diagnostic.

Figure 8:
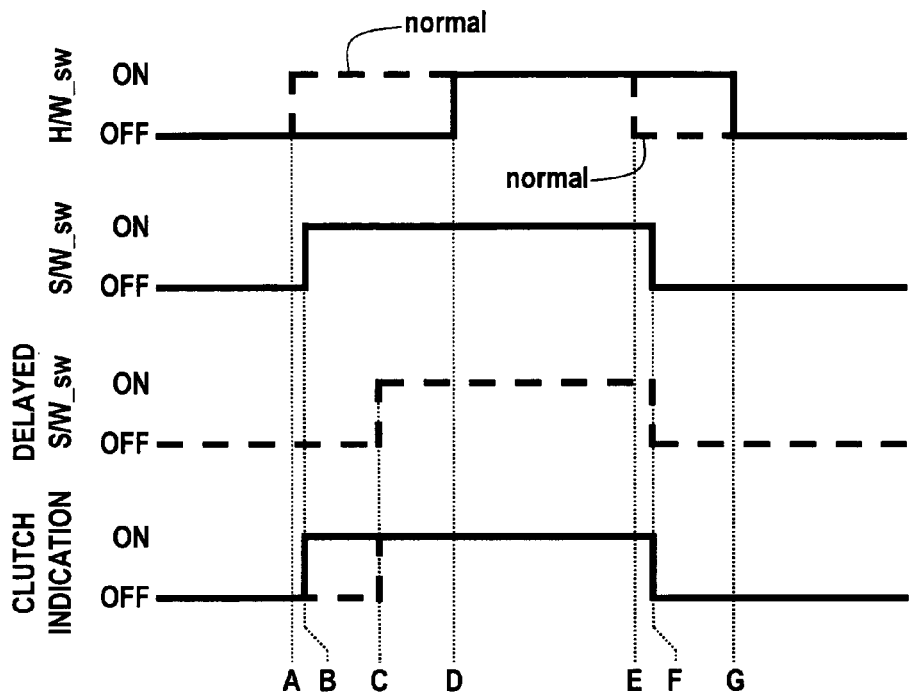
FIG. 8 is a diagram illustrating clutch apply and release diagnosis in an electro-hydraulic clutch apparatus experiencing a pressure switch anomaly affecting clutch application and release determinations in accordance with the present invention.

FIG. 8 illustrates a hardware switch H/W_sw response to clutch chamber pressure that is anomalous with respect to both applications and releases of the clutch. The clutch application is shown indicated by the state change in H/W_sw at time D which is significantly delayed from the normally expected time A and outside of the delay duration provided with respect to the software switch S/W_sw. Such an anomalous result may be occasioned by a sticking or out of calibration pressure sensor, for example. An undelayed software switch would result in CLUTCH INDICATION state change indicative of clutch application substantially at time B whereas a delayed software switch would result in CLUTCH INDICATION state change indicative of clutch application substantially at time C. The clutch release is shown indicated by the state change in H/W_sw at time G which is significantly delayed from the normally expected time E and beyond the time of the state change provided with respect to the software switches S/W_sw and DELAYED_sw. Such an anomalous result may be occasioned by a sticking or out of calibration pressure sensor, for example. Either exemplary software switch would result in CLUTCH INDICATION state change indicative of clutch release substantially at time F. Though not separately illustrated, a delay may be added to S/W_sw in the same fashion for the clutch release indication as was done for the clutch application indication if desired.

Figure 9:
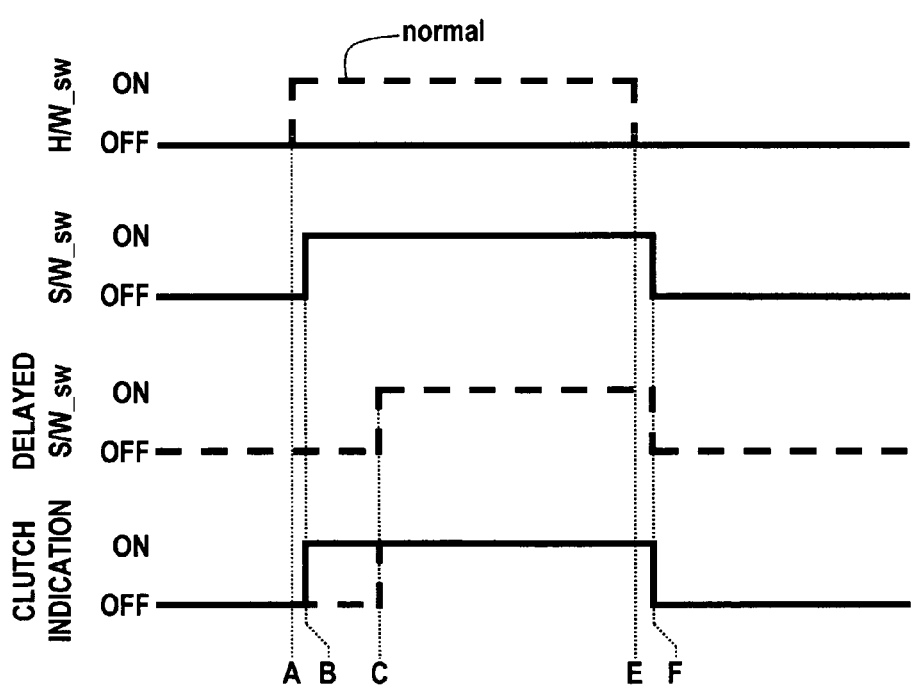
FIG. 9 is a diagram illustrating clutch apply and release diagnosis in an electro-hydraulic clutch apparatus experiencing a pressure switch anomaly affecting clutch application and release determinations in accordance with the present invention.

Finally, FIG. 9 illustrates another hardware switch H/W_sw response to clutch chamber pressure that is anomalous with respect to both applications and releases of the clutch. In this example, H/W_sw never transitions from an OFF state to and ON state. Such an anomalous result may be occasioned by a sticking or out of calibration pressure sensor, or wiring harness faults, for example. An undelayed software switch would result in CLUTCH INDICATION state change indicative of clutch application substantially at time B whereas a delayed software switch would result in CLUTCH INDICATION state change indicative of clutch application substantially at time C. Similarly, either exemplary software switch would result in CLUTCH INDICATION state change indicative of clutch release substantially at time F. Again, though not separately illustrated, a delay may be added to S/W_sw in the same fashion for the clutch release indication as was done for the clutch application indication if desired.

The present description of the apparatus and method disclosed herein is intended to be taken by way of non-limiting example of the invention. One skilled in the art will recognize various alternatives and modifications within the spirit and scope of the invention as taught herein and as defined in the property rights of the appended claims.

The invention claimed is:

1. Method for indicating clutch state change in a clutch system including a clutch fluidically applied in accordance with fluid pressure in a control chamber, comprising:
   providing a fluid pressure based clutch state switch characterized by a first pressure based state signal indicating clutch application and a second pressure based state signal indicating clutch release;
   providing a slip based clutch state switch characterized by a first slip based state signal indicating clutch application and a second slip based state signal indicating clutch release; and
   providing a clutch state change signal upon the first of the respective pressure based clutch state switch and the slip based clutch state switch state signals to change.

2. The method for indicating clutch state change as claimed in claim 1 wherein providing a fluid pressure based clutch state switch comprises:
   providing a pressure sensor in fluid communication with the control chamber; and
   monitoring said pressure sensor and providing said first pressure based state signal when a first pressure condition is detected and said second pressure based state signal when a second pressure condition is detected.

3. The method for indicating clutch state change as claimed in claim 2 wherein said pressure sensor comprises a pressure transducer.

4. The method for indicating clutch state change as claimed in claim 2 wherein said pressure sensor comprises a pressure switch.

5. The method for indicating clutch state change as claimed in claim 1 wherein said first slip based state signal of said slip based clutch state switch is effected in accordance with passage of a duration subsequent to issuance of a clutch application command.

6. The method for indicating clutch state change as claimed in claim 5 wherein the duration is based on an historically determined clutch apply time.

7. The method for indicating clutch state change as claimed in claim 6 wherein the historically determined clutch apply time is determined as a function of a clutch apply command timing and a minimum clutch slip timing.

8. The method for indicating clutch state change as claimed in claim 1 wherein said second slip based state signal of said slip based clutch state switch is effected in accordance with passage of a duration of continuous clutch slip in excess of a predetermined slip.

9. The method for indicating clutch state change as claimed in claim 1 wherein said first slip based state signal of said slip based clutch state switch is effected in accordance with passage of a first duration subsequent to issuance of a clutch application command and said second slip based state signal of said slip based clutch state switch is effected in accordance with passage of a second duration of continuous clutch slip in excess of a predetermined slip.

10. Apparatus comprising:
    a clutch fluidically applied in accordance with fluid pressure in a control chamber responsive to a clutch application command;
    a pressure sensor in fluid communication with the control chamber;
    means for determining clutch slip; and
    a controller executing a computer program, the program including:
    computer readable code to determine a first clutch state switch based on fluid pressure and characterized by a first pressure based state signal indicating clutch application and a second pressure based state signal indicating clutch release;
    computer readable code to determine a second clutch state switch based on clutch slip and characterized by a first slip based state signal indicating clutch application and a second slip based state signal indicating clutch release; and
    computer readable code to determine a clutch state change signal upon the first of the pressure based clutch state switch and the slip based clutch state switch state signals to change.

11. The apparatus as claimed in claim 10 wherein said pressure sensor comprises a pressure transducer.

12. The apparatus as claimed in claim 10 wherein said pressure sensor comprises a pressure switch.

13. The apparatus as claimed in claim 10 wherein said first slip based state signal of said second clutch state switch is determined in accordance with passage of a duration subsequent to issuance of the clutch application command.

14. The apparatus as claimed in claim 10 wherein said second state signal of said second slip based clutch state switch is determined in accordance with passage of a duration of continuous clutch slip in excess of a predetermined slip.

15. The apparatus as claimed in claim 10 wherein said first slip based state signal of said second clutch state switch is determined in accordance with passage of a first duration subsequent to issuance of a clutch application command and said second slip based state signal of said second clutch state switch is determined in accordance with passage of a second duration of continuous clutch slip in excess of a predetermined slip.

* * * * *